US010517227B2

(12) United States Patent
Ma

(10) Patent No.: US 10,517,227 B2
(45) Date of Patent: Dec. 31, 2019

(54) INDOOR THREE-DIMENSIONAL PLANTING FRAME

(71) Applicant: Foshan GrowSpec Eco-Agriculture Technology Co., Ltd., Foshan, Guangdong (CN)

(72) Inventor: Yong Ma, Guangdong (CN)

(73) Assignee: Foshan GrowSpec Eco-Agriculture Technology Co., Ltd., Foshan (CN)

( * ) Notice: Subject to any disclaimer, the term of this patent is extended or adjusted under 35 U.S.C. 154(b) by 260 days.

(21) Appl. No.: 15/806,281

(22) Filed: Nov. 7, 2017

(65) Prior Publication Data
US 2019/0075735 A1 Mar. 14, 2019

(30) Foreign Application Priority Data
Sep. 12, 2017 (CN) .......................... 2017 1 0817933

(51) Int. Cl.
| A01G 9/02 | (2018.01) |
| A47B 47/00 | (2006.01) |
| A01G 7/04 | (2006.01) |
| H05B 33/08 | (2006.01) |

(52) U.S. Cl.
CPC ............ *A01G 9/023* (2013.01); *A01G 7/045* (2013.01); *A47B 47/0075* (2013.01); *H05B 33/0857* (2013.01)

(58) Field of Classification Search
CPC ........ A01G 9/023; A01G 9/045; A01G 31/06; A01G 5/04; A01G 18/62
See application file for complete search history.

(56) References Cited

U.S. PATENT DOCUMENTS

| 4,493,163 | A | * | 1/1985 | de Monbrison | ....... | A01G 31/06 47/61 |
| 6,393,764 | B1 | * | 5/2002 | Smith | ...................... | A01G 9/02 47/65.5 |
| 8,151,518 | B2 | * | 4/2012 | Adams | ................... | A01G 31/06 47/82 |
| 2016/0014977 | A1 | * | 1/2016 | Esaki | ..................... | A01G 31/06 47/66.6 |
| 2016/0235025 | A1 | * | 8/2016 | Bray | ...................... | A01G 31/06 |
| 2016/0360712 | A1 | * | 12/2016 | Yorio | ..................... | A01G 7/045 |
| 2017/0055474 | A1 | * | 3/2017 | Storey | .................... | A01G 31/02 |
| 2017/0223904 | A1 | * | 8/2017 | Raccanello | ............ | A01G 9/247 |
| 2019/0092567 | A1 | * | 3/2019 | Lawrence | .............. | A01G 9/143 |

* cited by examiner

*Primary Examiner* — Monica L Williams

(57) ABSTRACT

An indoor three-dimensional planting frame, includes a composite frame, a control system, planting pots and LED light panels, wherein the composite frame is assembled from a plurality of side baffles, fixing rings and fixing plates; said side baffles are vertically arranged on both sides of a frame body of the composite frame, and ends of adjacent side baffles are connected to the fixing rings; the fixing rings are arranged horizontally as rectangular rings of beams, and a plurality of mounting holes are arranged thereon; the fixing plates are bracket plates; the LED light panels are fixed at the bottom of the fixing plates with screws, and multiple LED light wicks are arranged on the LED light panels; The indoor three-dimensional planting frame helps control the plant growth photoperiod and photomorphogenesis by controlling the work cycle of the grow lights and the fans.

12 Claims, 6 Drawing Sheets

INDOOR THREE-DIMENSIONAL PLANTING FRAME

CROSS-REFERENCE TO PRIOR APPLICATION

The present application claims the benefit of Chinese Patent Application No. 201710817933.3, filed on Sep. 12, 2017, which is incorporated herein by reference.

TECHNICAL FIELD

The invention relates to the field of plant cultivation technology, in particular to an indoor three-dimensional planting frame.

BACKGROUND

Sunlight is one of the important physical environments required for plant growth and development. However, sunlight cannot irradiate plants for 24 consecutive hours; as a result, the plant growth efficiency is reduced. LED light source has the advantage of abundant wavelength types, and the light energy of LED lights is consistent with the spectrum range required for plant photosynthesis. Therefore, various LED lights can be combined as required to obtain monochromatic light or compound light. LED grow lights just take advantage of the function of the LED lights to concentrate light of a specific wavelength to irradiate plants evenly, which can not only regulate the flowering and fruiting of plants, but also control plant height and plant nutrients. As a result, LED grow lights are widely used in such fields as plant cultivation, protected horticulture and industrial seedling.

Existing LED grow lights are designed with a focus on the combination and selection of LED spectra without full consideration of the heat dissipation and systematic controllability thereof. Especially in high power LED grow lights, heat dissipation can directly affect the performance of the overall LED grow lights; and differentiated control by category is particularly important when different plants are planted and cultivated in the same equipment.

SUMMARY OF THE INVENTION

In order to solve the technical problem, the invention provides an indoor three-dimensional planting frame.

The technical scheme of the invention is as follows:

An indoor three-dimensional planting frame, comprising a composite frame, a control system, planting pots and LED light panels;

The composite frame is assembled from a plurality of side baffles, fixing rings and fixing plates; the side baffles are vertically arranged on both sides of a frame body of the composite frame, and ends of adjacent side baffles are connected to the fixing rings; the fixing rings are arranged horizontally as rectangular rings of beams, and a plurality of mounting holes are arranged thereon;

The fixing plates are bracket plates for placement of the planting pots; bent flangings used as support legs are arranged at the bottom of the fixing plates; the LED light panels are fixed at the bottom of the fixing plates with screws, and multiple LED light wicks are arranged on the LED light panels.

Preferably, a plurality of through holes running through upper and lower end faces of the fixing plates are arranged thereon for heat dissipation, air diversion and weight reduction;

Front and rear edges at the bottom of the fixing rings are folded inward to form grooves, the support legs of the fixing plates are placed in the grooves, and the width of the grooves is well matched with the width of the support legs.

Edges of upper and lower end faces of the side baffles are bent inward to form flangings to facilitate fitting of adjacent side baffles during assembly; edges of front and rear end faces of the side baffles are bent inward to form stiffeners to strengthen the strength of the side baffles; a plurality of uniformly distributed deflector holes are formed on hollow surfaces of the side baffles; fans are fixedly connected to the side baffles and electrically connected to the control system, and the controller controls the working state of the fans;

In order to reinforce the structure of the composite frame, the composite frame further comprises middle baffles used as stiffeners; and the middle baffles are vertically arranged in the middle part on the back of the frame body of the composite frame, and fixed on the fixing rings through fasteners.

The control system comprises a drive power and a controller (light source controller), and the controller is used to adjust and control LED lights to provide light sources at different wavelengths for plants and the working state of fans, providing a systematic lighting scheme for plants.

The indoor three-dimensional planting frame provides adaptive light sources for different plants and different plant growth cycles. Generally, 450 nm blue light, 660 nm red light, 730 nm far red light, EQ white light, dark blue light and ultra red light for plants can provide spectra necessary for photosynthesis. Far red light can control the whole process from germination to vegetative growth and to flowering of plants. The appropriate combination of dark blue light, ultra red light and far red light can provide better chromatographic coverage and the optimum growth mode.

The controller is provided with a Nixie tube display area, a layer switch area and a layer time setting area. The Nixie tube display area is used to display the turn-on days and time set for the current layer; the layer switch area is used to display the number of the current working layers; and the layer time setting area is used to set relevant parameters for different layers.

The input end of the controller is connected with the drive power, and the output end thereof is connected with the LED light panels and the fans.

A tapered cabinet leg is arranged at each corner at the bottom of said composite frame, and a footing is arranged on the tapered cabinet leg.

The beneficial effects of the invention are as follows:

The indoor three-dimensional planting frame comprises a plurality of planting and cultivating layers, and different lighting schemes can be set for different layers respectively according to plants cultivated thereon. As a result, the scope of application of the indoor three-dimensional planting frame is enlarged, and a system can be applied to the cultivation of most plants or different types of plants can be cultivated in different layers of the same indoor three-dimensional planting frame.

The indoor three-dimensional planting frame controls operation settings of the whole system through the controller for opening plant leaf stomata, supplementing carbon dioxide and training root growth;

The controller can control the left and right fans to work alternately;

The controller can control the settings of each layer separately. Users can set relevant parameters for each layer, and save the parameter settings;

The indoor three-dimensional planting frame helps control the plant growth photoperiod and photomorphogenesis by controlling the work cycle of the grow lights and the fans, thus ultimately controlling the life cycle of plant morphology.

The indoor three-dimensional planting frame has the advantages of convenient assembly and disassembly, stable and solid structure, easy to use and control, and long service life.

DETAILED DESCRIPTION OF THE PREFERRED EMBODIMENT

Figure 1:
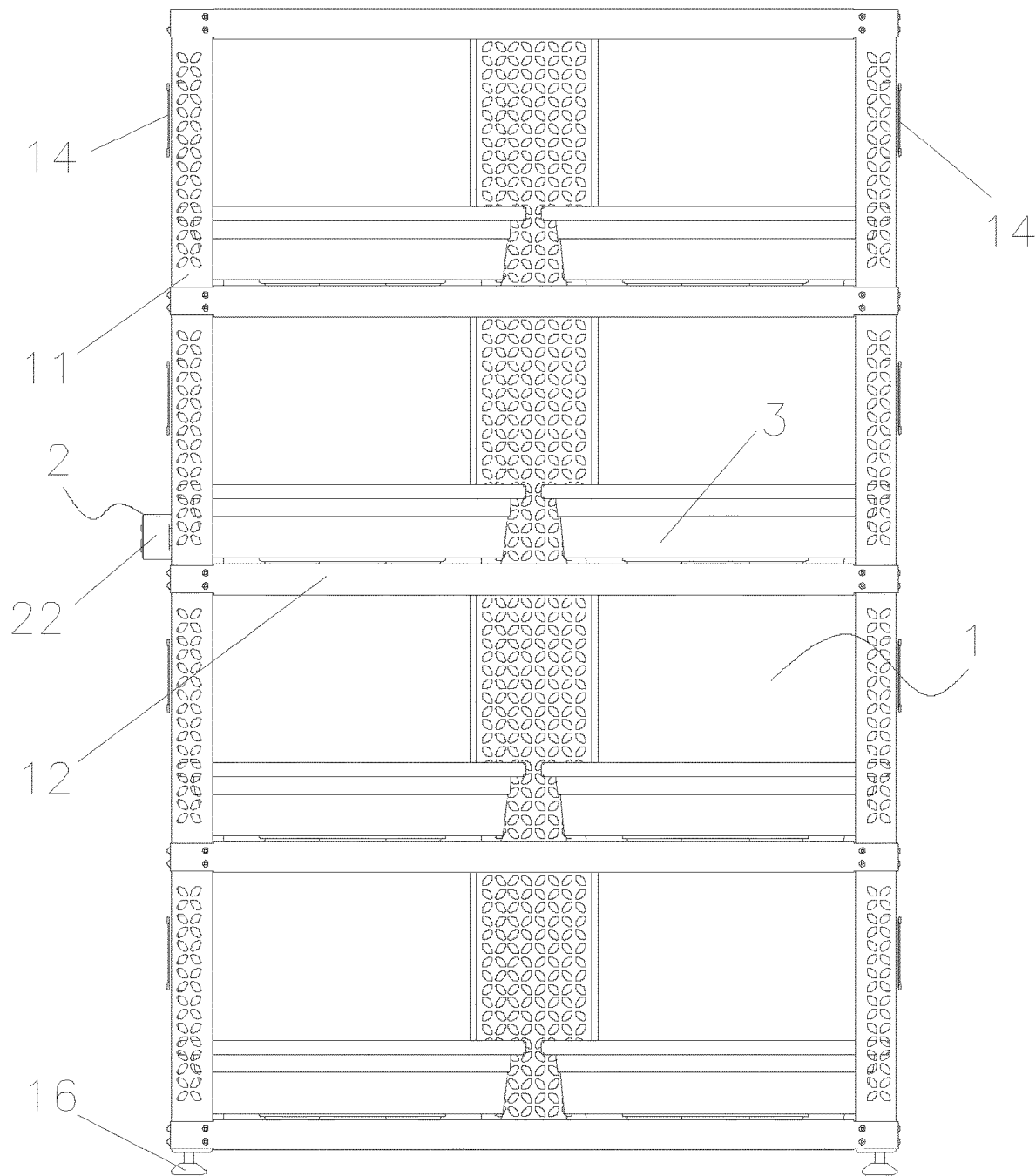
FIG. 1 is a front view of a structural diagram of an indoor three-dimensional planting frame of the invention.
Figure 2:
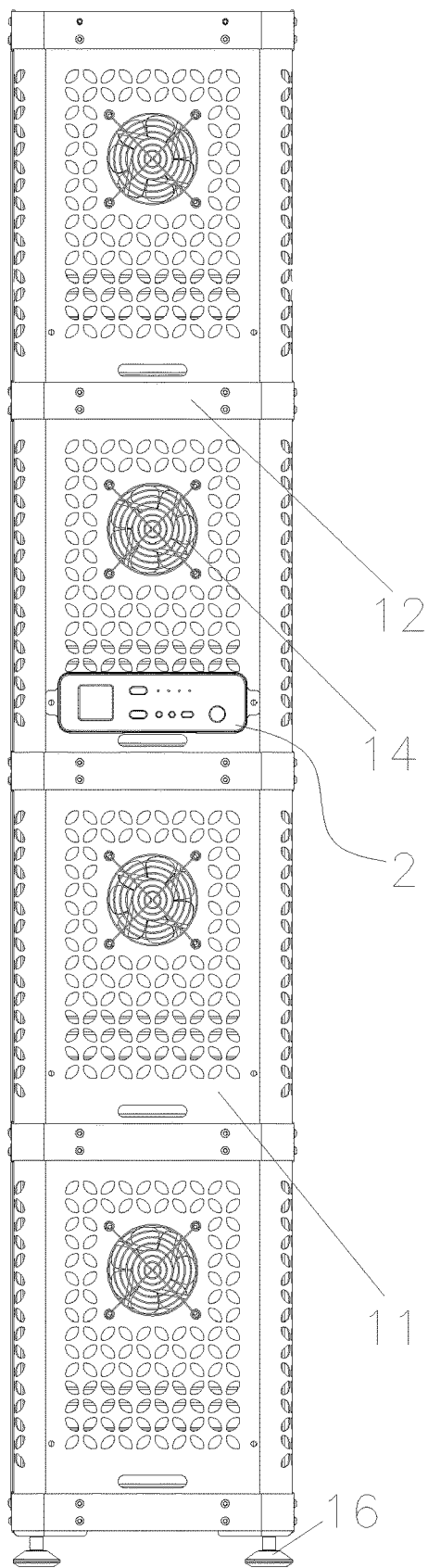
FIG. 2 is a side view of an indoor three-dimensional planting frame of the invention.
Figure 3:
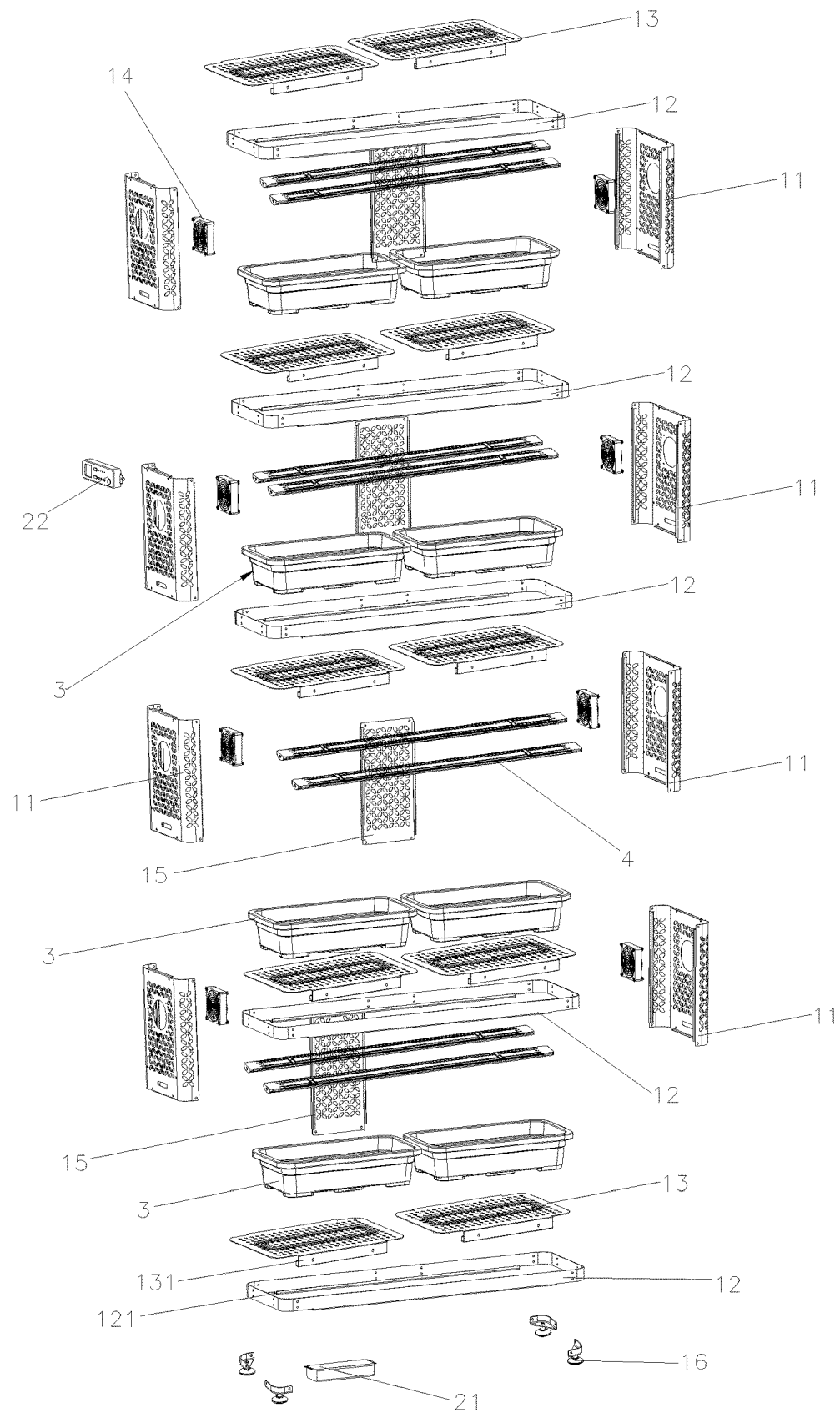
FIG. 3 is a breakdown structural diagram of an indoor three-dimensional planting frame of the invention.
Figure 4:
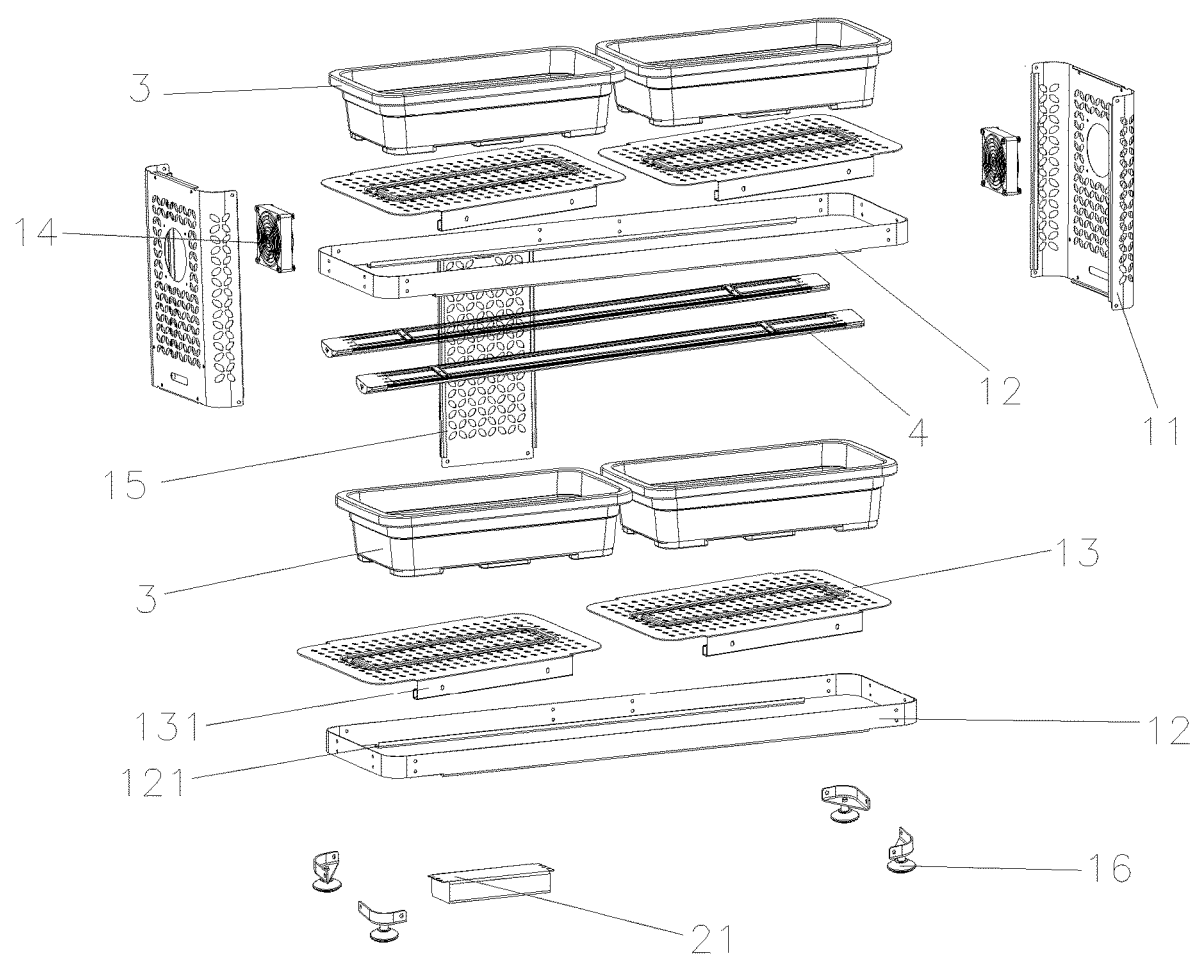
FIG. 4 is a local enlarged view of FIG. 3.
Figure 5:
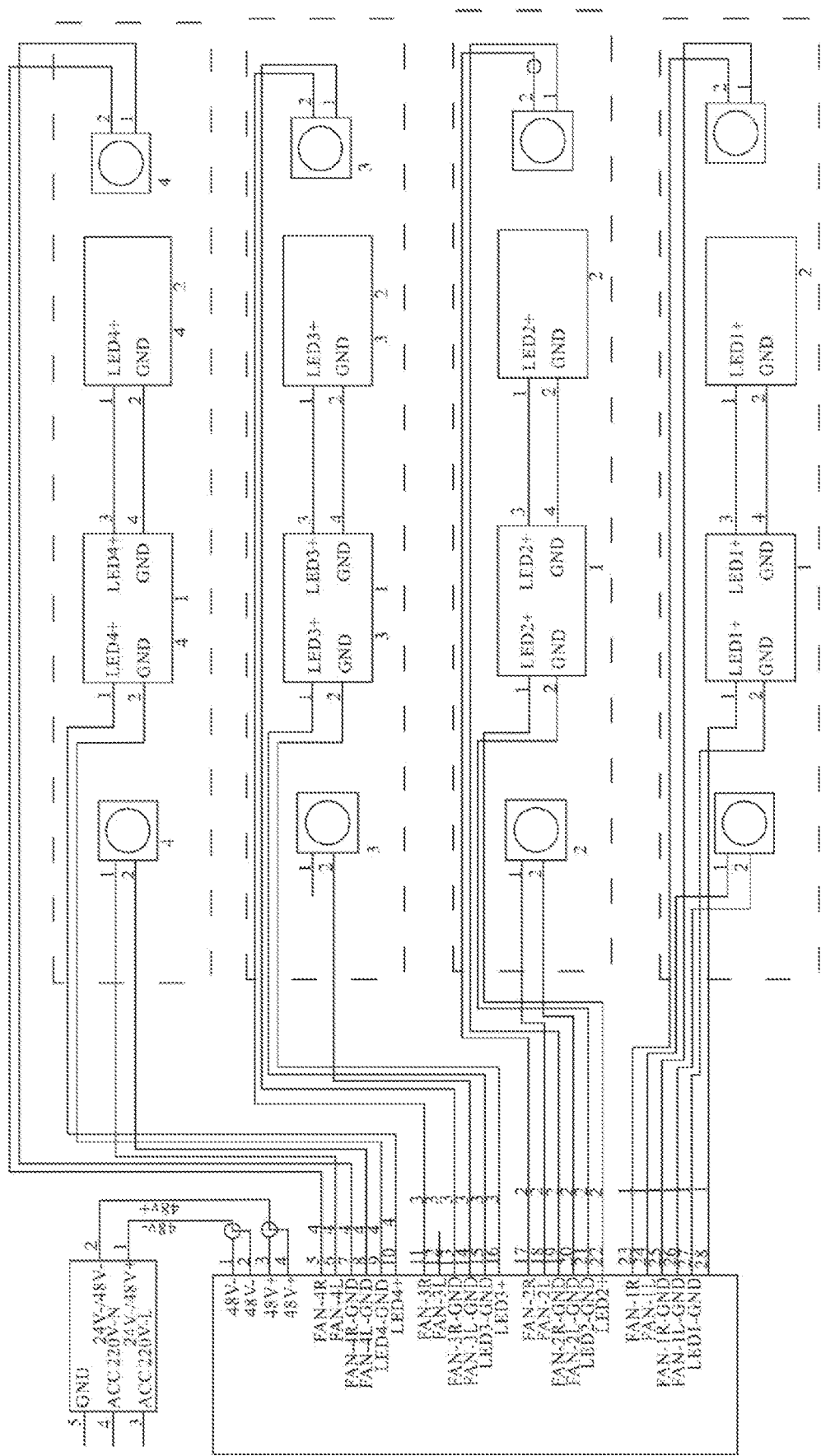
FIG. 5 is a schematic diagram of the control system.

The specific examples of the invention will be further illustrated in detail below in conjunction with drawings. It should be understood that the examples described here are only for the purpose of explaining the invention and not limiting the invention. In addition, the technical features described below in the examples of the invention can be combined with each other in the event of no conflict.

Referring to FIG. 1 to FIG. 5, an indoor three-dimensional planting frame, comprising a composite frame 1, a control system 2, planting pots 3 and LED light panels 4;

The composite frame 1 is assembled from a plurality of side baffles 11, fixing rings 12 and fixing plates 13; the side baffles 11 are vertically arranged on both sides of a frame body of the composite frame 1, and ends of adjacent side baffles 11 are connected to the fixing rings 12; the fixing rings 12 are arranged horizontally as rectangular rings of beams, and a plurality of mounting holes are arranged thereon;

The fixing plates 13 are bracket plates for placement of the planting pots 3; bent flangings used as support legs 131 are arranged at the bottom of the fixing plates 13; the LED light panels 4 are fixed at the bottom of the fixing plates 13 with screws, and multiple LED light wicks are arranged on the LED light panels 4.

Preferably, a plurality of through holes running through upper and lower end faces of the fixing plates 13 are arranged thereon for heat dissipation, air diversion and weight reduction;

Front and rear edges at the bottom of said fixing rings 12 are folded inward to form grooves 121, the support legs 131 of the fixing plates 13 are placed in the grooves 121, and the width of the grooves 121 is well matched with the width of said support legs 131.

Edges of upper and lower end faces of the side baffles 11 are bent inward to form flangings to facilitate fitting of adjacent side baffles 11 during assembly; edges of front and rear end faces of the side baffles 11 are bent inward to form stiffeners to strengthen the strength of the side baffles 11; a plurality of uniformly distributed deflector holes are formed on hollow surfaces of the side baffles 11; fans 14 are fixedly connected to the side baffles 11 and electrically connected to the control system 2, and the controller 22 controls the working state of the fans 14.

In order to reinforce the structural stability of the composite frame 1, the composite frame 1 further comprises middle baffles 15 used as stiffeners; and the middle baffles 15 are vertically arranged in the middle part on the back of the frame body, and fixed on the fixing rings 12 through fasteners.

The control system 2 comprises a drive power 21 and a controller 22, and the controller 22 is used to adjust and control LED lights to provide light sources at different wavelengths for plants and the working state of the fans 14, providing a systematic lighting scheme for plants.

The indoor three-dimensional planting frame provides adaptive light sources for different plants and different plant growth cycles. Generally, 450 nm blue light, 660 nm red light, 730 nm far red light, EQ white light, dark blue light and ultra red light for plants can provide spectra necessary for photosynthesis. Far red light can control the whole process from germination to vegetative growth and to flowering of plants. The appropriate combination of dark blue light, ultra red light and far red light can provide better chromatographic coverage and the optimum growth mode.

Figure 6:
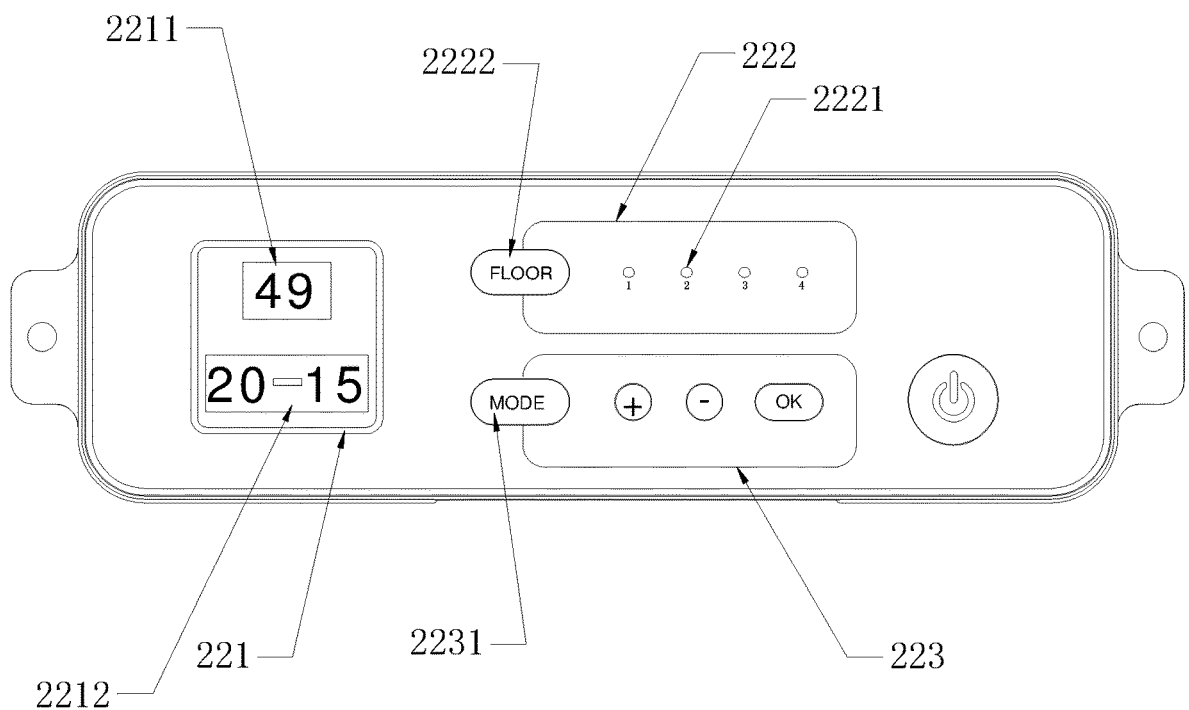
FIG. 6 is a schematic diagram of the controller.

Referring FIG. 6, the controller 22 is provided with a Nixie tube display area 221, a layer switch area 222 and a layer time setting area 223. The Nixie tube display area 221 is used to display the turn-on days and time set for the current layer; the layer switch area 222 is used to display the number of the current working layers; and the layer time setting area 223 is used to set relevant parameters for different layers.

The Nixie tube display area 221 is provided with a Days display panel 2211 and a time display panel 2212. The layer switch area 222 is provided with a layer display area 2221 and a layer setting button 2222. The layer time setting area 223 is provided with a mode setting button 2231.

In the embodiment of the present invention, the layer setting button 2222 is a layer selection button 2222. The present invention takes the planting frame with four layers as an example, and the layer selection button 2222 can switch the four corresponding layers in turn; when the corresponding layer is selected, the layer display area 2221 displays the corresponding layer.

The mode setting button 2231 can set the number of days in the timer and the clock mode, and the number of days of the current scheduled timing can be set by the mode setting button 2231 and the number of days shown by the Days display panel 2211. At the same time, the mode settings button 2231 can also set each day each layer of LED light panels 4 and fan 14 daily working time and displaying the working time by the time display panel 2212. And the mode setting button 2231 can also set and correct the clock time.

The input end of the controller 22 is connected with the drive power 21, and the output end thereof is connected with the LED light panels 4 and the fans 14.

A tapered cabinet leg 16 is arranged at each corner at the bottom of the composite frame 1, and a footing is arranged on the tapered cabinet leg 16.

The examples of the invention are described in detail above in conjunction with drawings, but the invention is not limited thereto. It should be understood by a person skilled in the art that all changes, modifications, replacements and variations made to the embodiments can be incorporated in the protection scope of the invention without departing from the rule and spirit of the invention.

What is claimed is:

1. An indoor three-dimensional planting frame, comprising a composite frame, a control system, planting pots and LED light panels, wherein, the composite frame is assembled from a plurality of side baffles, fixing rings and fixing plates; the side baffles are vertically arranged on both sides of a frame body of the composite frame, and ends of adjacent side baffles are connected to the fixing rings; the fixing rings are arranged horizontally as rectangular rings of beams, and a plurality of mounting holes are arranged thereon;

the fixing plates are bracket plates for placement of the planting pots, and a plurality of through holes running through upper and lower end faces of the fixing plates are arranged thereon;

bent flangings used as support legs are arranged at the bottom of the fixing plates; the LED light panels are fixed at the bottom of the fixing plates with screws, and multiple LED light wicks are arranged on the LED light panels.

2. The indoor three-dimensional planting frame according to claim 1, wherein front and rear edges at the bottom of the fixing rings are folded inward to form grooves, the support legs of the fixing plates are placed in the grooves, and the width of the grooves is well matched with the width of the support legs.

3. The indoor three-dimensional planting frame according to claim 2, wherein fans are fixedly connected to the side baffles, and electrically connected to the control system.

4. The indoor three-dimensional planting frame according to claim 3, wherein said composite frame further comprises middle baffles used as stiffeners; and said middle baffles are vertically arranged in the middle part on the back of the frame body of the composite frame, and fixed on the fixing rings through fasteners.

5. The indoor three-dimensional planting frame according to claim 1, wherein edges of upper and lower end faces of the side baffles are bent inward to form flangings; edges of front and rear end faces of the side baffles are bent inward to form stiffeners; and a plurality of uniformly distributed deflector holes are formed on hollow surfaces of the side baffles.

6. The indoor three-dimensional planting frame according to claim 5, wherein fans are fixedly connected to the side baffles, and electrically connected to the control system.

7. The indoor three-dimensional planting frame according to claim 6, wherein said composite frame further comprises middle baffles used as stiffeners; and said middle baffles are vertically arranged in the middle part on the back of the frame body of the composite frame, and fixed on the fixing rings through fasteners.

8. The indoor three-dimensional planting frame according to claim 1, wherein the control system comprises a drive power and a controller, the controller is used to adjust and control LED lights to provide light sources at different wavelengths for plants and the working state of fans; the input end of the controller is connected with the drive power, and the output end of the controller is connected with the LED light panels and the fans.

9. The indoor three-dimensional planting frame according to claim 8, wherein the controller is provided with a Nixie tube display area, a layer switch area and a layer time setting area.

10. The indoor three-dimensional planting frame according to claim 8, wherein a tapered cabinet leg is arranged at each corner at the bottom of the composite frame, and a footing is arranged on the tapered cabinet leg.

11. The indoor three-dimensional planting frame according to claim 1, wherein fans are fixedly connected to the side baffles, and electrically connected to the control system.

12. The indoor three-dimensional planting frame according to claim 11, wherein said composite frame further comprises middle baffles used as stiffeners; and said middle baffles are vertically arranged in the middle part on the back of the frame body of the composite frame, and fixed on the fixing rings through fasteners.

* * * * *